(No Model.) 2 Sheets—Sheet 1.

N. B. CUSHING.
BRAKE FOR HOISTING ENGINES.

No. 372,013. Patented Oct. 25, 1887.

WITNESSES:

INVENTOR
Nichols B. Cushing
BY
Whitehead & Suydam
ATTORNEY (No Model.) 2 Sheets—Sheet 2.

N. B. CUSHING.
BRAKE FOR HOISTING ENGINES.

No. 372,013. Patented Oct. 25, 1887.

WITNESSES:
David G. Brown.
Wm Scudder

INVENTOR
Nichols B. Cushing
BY
Whitehead & Suydam
ATTORNEYS

UNITED STATES PATENT OFFICE.

NICHOLS B. CUSHING, OF JERSEY CITY, NEW JERSEY.

BRAKE FOR HOISTING-ENGINES.

SPECIFICATION forming part of Letters Patent No. 372,013, dated October 25, 1887.

Application filed December 31, 1886. Serial No. 223,153. (No model.)

*To all whom it may concern:*

Be it known that I, NICHOLS B. CUSHING, of Jersey City, in the State of New Jersey, have invented a new and useful Improvement in Winding or Hoisting Engines, of which the following is a specification.

The object of my invention is to provide brakes for hoisting-engines used for elevating and lowering passengers and freight, with a safety device for automatically applying the brake and stopping the engine, when from any cause the car or platform becomes obstructed or hung up in its ways, the hoist-ropes break, or the engine exceeds a given rate of speed.

Figure 1:
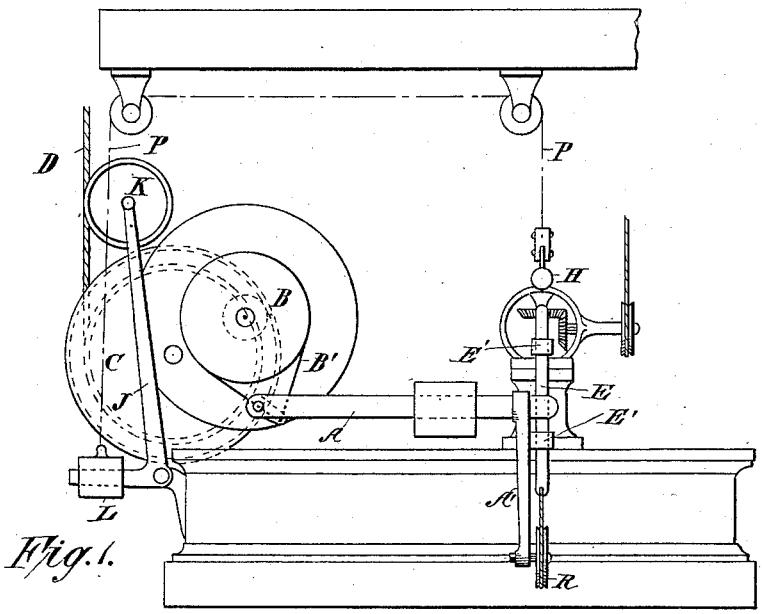
Figures 2, 3:
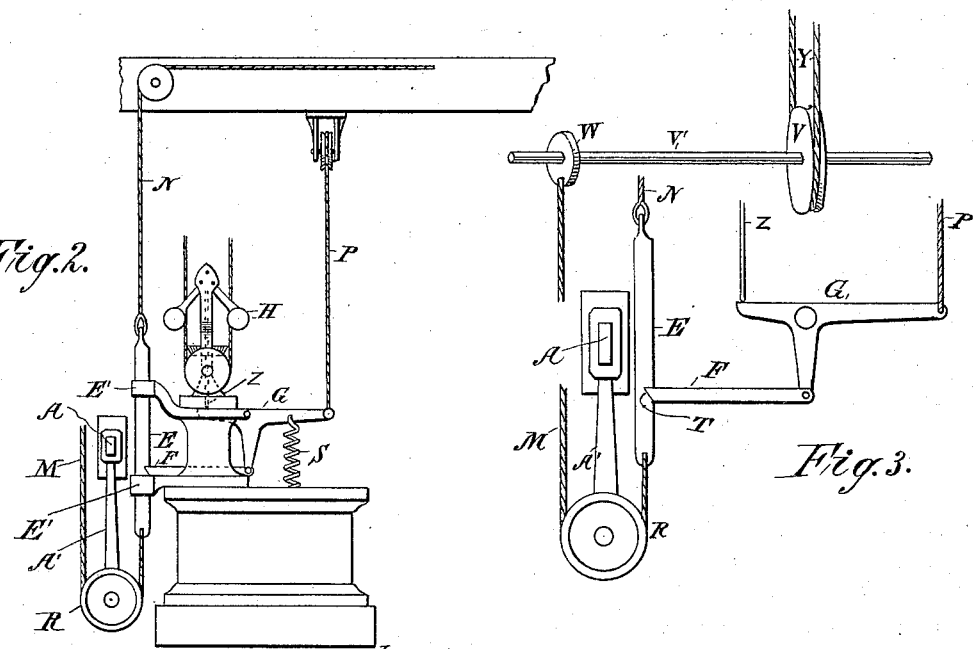
Figure 4:
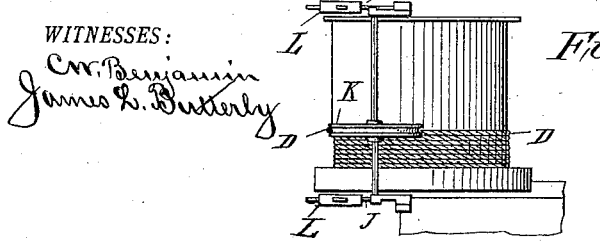
Figure 5:
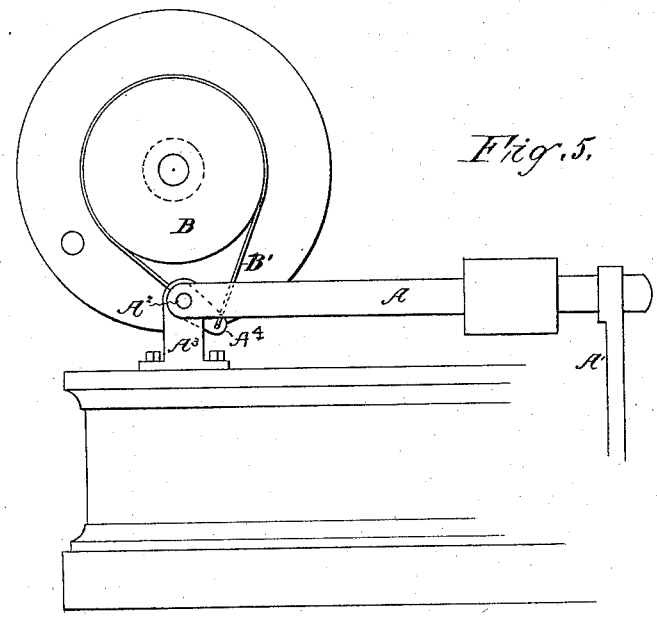

Figure 1 is a side view, and Fig. 2 an end view, of an ordinary hoisting-engine containing my invention. Fig. 3 is a diagram showing in detail the parts of my invention which operate the brake separated from their attachments, but occupying their proper positions relative to each other; Fig. 4, a plan of the winding-drum, showing the swinging frame. Fig. 5 is a side view of the fulcrum end of the brake-lever A, showing the standard upon which it is fulcrumed.

B' is a brake-band, which surrounds the brake-wheel B, and which is operated by the brake-lever A in the manner usual in engines of the class shown in the drawings.

C is the winding-drum, D the hoist-rope, and H is a regulator constructed substantially like the governor of a steam-engine and adjusted to operate a thrust-pin, Z, in case the engine exceeds a given rate of motion. The brake-lever A is fulcrumed by its fulcrum-pin $A^2$, Fig. 5, which passes through bearings in the standard $A^3$, attached to the frame of the engine. A short arm, $A^4$, is carried either by the fulcrum-pin or by the lever A, as may be convenient, set at an angle with the brake-lever A. To the short arm $A^4$ one end of the brake-band B' is pivoted, the other end of the brake-band being pivoted to the fulcrum-pin $A^2$.

The brake-lever A is weighted, and by its gravity the brake-band B', which is connected with it in the usual and well-known manner, is tightened around the periphery of the brake-wheel B and the engine is stopped. To start the engine, the brake-lever A is raised, thereby releasing the tension of the brake-band B upon the brake-wheel B. The brake-lever A is raised to release the brake by means of the brake-rope M, which is connected in the usual manner, through the cam W, the shaft V', and the pulley V, with the hand-rope Y, as shown in the diagram, Fig. 3, which passes up into the elevator-shaft, or wherever it is desirable or convenient to place the operator. These parts are all well known and commonly used in hoisting-engines.

In place of attaching the brake-rope M directly to the brake-lever A, as is customary in such engines, in my invention I attach to the brake-lever A a rod or arm, A', which carries a sheave, R, and I pass the brake-rope M around the sheave R and attach the standing part to the bar or rod E, which I call the "sliding bar" in this specification. The sliding bar E is a rod or bar, which is held by means of the fixed brackets E' E', and which are provided with openings through which the sliding bar E passes, the openings being large enough to permit the sliding bar to move freely within them in the direction of its length.

Since the brake-lever A falls and applies the brake by its own weight, the function of the brake-rope M, operated by the means of the hand-rope Y, (through the pulley V, the shafting V', and the cam W,) is either to raise and hold the brake-lever A suspended, so as to release the brake, start the engine, and allow it to keep in motion, or to allow it to lower by its own weight when it is desired to stop the engine. When no longer held suspended by the brake-rope M, or when it is left free to fall, the brake will be applied and the engine stopped. To enable the brake-rope M to perform these functions, the sliding bar E, to which the standing part of the brake-rope M is attached, is held firmly in place within the brackets E' E', by means of a catch or grip, and so forms a fixed support for the standing part of the brake-rope M. When the catch or grip is operated to release the sliding bar E, it falls and no longer affords the brake-rope M any fixed attachment, which then ceases to sustain the brake-lever A, which falls and applies the brake, as before explained.

The sliding bar E can be held in place by any grip, clutch, or cam, which can be operated to release the sliding-bar, when it is desired;

but in practice I prefer to hold it in place in the brackets E' E', for the ordinary operation of the engine, by means of a catch-bar, F, which is a bar or bolt free to move to and fro in the direction of its length at right angles to the sliding bar E upon a solid bed in the casting which carries the regulator H. One end is fitted into a notch, T, formed in the sliding bar E, and the other end is pivoted to one of the arms of the three-armed lever G, which is pivoted by its center to the casting which supports the regulator H.

I provide a spring, S, attached to the frame of the engine and to one of the arms of the lever G, which tends to hold the point of the catch-bar F in the notch T in the sliding bar E, which is then firmly held in place for the ordinary operations of the engine.

The regulator H is similar in construction and operation to the governor of a steam-engine, and is connected by a band or strap to any rotating shaft or pulley of the engine, as may be convenient, by which a rotary motion is given to it. A thrust-pin, Z, is connected with the arms of the regulator H, in the well-known manner, and is adjusted to rest upon one of the arms of the lever G and to be inoperative until a given rate of speed is exceeded. In that event the lifting of the arm of the regulator operates to depress the thrust-pin Z, which forces down the arm of the lever G, overcoming the tension of the spring S and withdrawing the catch-bar F from the notch T in the sliding bar E, which then falls, letting go the standing part of the brake-rope M, and with it falls the brake-lever E, and the brake is applied and the engine stopped, as before explained. To another arm of the lever G, I attach a rope, chain, or rod, (shown at P,) which is led directly or by pulleys, as may be most convenient, to the swinging frame J, Figs. 1 and 4, to which it is attached. The swinging frame J is a frame hinged to the bed of the engine, or to the walls or ceiling of the engine-room, as may be most convenient, and consists of two arms, J J, set at each end of the winding-drum C, and connected by a spindle on which runs loose a sheave or roller, K, which is pressed against the hoist-rope D, by springs or weights, and travels along the spindle to follow the hoist-rope D as it is wound or unwound upon the winding-drum C. The frame J is prevented from falling or being thrust forward by the tension of the hoist-rope D, and when that tension is relieved by the hoist-rope D breaking, or becoming slack from any cause, the frame is thrust forward by the action of the weight or springs, and, through the rope, chain, or rod P, actuates the lever G, to withdraw the catch-bar F from the notch in the sliding bar E, which then falls and applies the brake, as before explained.

In my drawings I have shown the frame J as pressed against the hoist-rope D by a weight, L, and the rope P attached to the weight L; but it may be attached to any part of the frame J.

For convenience I apply a hand line or rope to the sliding bar E, as shown at N in my drawings, which can be led to any convenient situation, and by which the sliding bar can be drawn back to its place after it has been released, and the standing part of the brake-rope M can be reset without the necessity of going to the engine for that purpose.

My invention can be applied to any existing hoisting-engine, as well as to one specially constructed for it, and the shape and conformation of the different parts of my invention can be modified to conform to the conditions under which they are to operate; and therefore I do not limit myself to the specific construction of the details as shown in my drawings.

What I claim as my invention, and desire to secure by Letters Patent, is—

1. In a hoisting-engine, in combination with the brake-lever A and the brake-rope M, an arm, A', attached to the brake-lever, carrying a sheave, R, around which passes the brake-rope M, the brake-wheel B, and the brake-band B', substantially as described, and for the purposes specified.

2. In a hoisting-engine, a sliding bar, E, in combination with the brake-rope M, the sheave R, the arm A', and the brake-lever A, the catch-bar F, the brake-wheel B, and the brake-band B', substantially as described, and for the purpose specified.

3. In a hoisting-engine, the combination and arrangement of the brake-lever A, the brake-rope M, the arm A', the sheave R, and the sliding bar E, with the catch-bar F, the three-armed lever G, regulator H, and the thrust-pin Z, substantially as described, and for the purpose specified.

4. In a hoisting-engine, the combination and arrangement of the sliding bar E, the brake-rope M, the sheave R, the arm A', and the brake-lever A, with the catch-bar F, the three-armed lever G, the regulator H, the swinging frame J, the sheave or roller K, and the hoist-rope D, substantially as described, and for the purpose specified.

NICHOLS B. CUSHING.

Witnesses:
A. Q. GARRETSON,
M. T. ROSENBERG.